United States Patent [19]

Miyamoto et al.

[11] Patent Number: 5,805,947
[45] Date of Patent: Sep. 8, 1998

[54] CAMERA PROVIDED WITH A SLIDING COVER

[75] Inventors: Hidenori Miyamoto, Urayasu; Masao Owashi, Yokohama; Masaaki Yanagisawa, Chigasaki; Shoko Ryuen, Ichikawa, all of Japan

[73] Assignee: Nikon Corporation, Tokyo, Japan

[21] Appl. No.: 760,961

[22] Filed: Dec. 5, 1996

[30] Foreign Application Priority Data

Dec. 8, 1995 [JP] Japan .................................. 7-320496
Dec. 8, 1995 [JP] Japan .................................. 7-320497
Dec. 8, 1995 [JP] Japan .................................. 7-320498

[51] Int. Cl.⁶ .................................................. G03B 17/00
[52] U.S. Cl. ........................................ 396/448; 396/535
[58] Field of Search .................................... 396/448, 535

[56] References Cited

U.S. PATENT DOCUMENTS

| | | | |
|---|---|---|---|
| 4,556,304 | 12/1985 | Fukuda | 396/448 |
| 4,589,747 | 5/1986 | Nakayama et al. | 396/448 |
| 5,107,287 | 4/1992 | Swayze | 396/178 |
| 5,508,769 | 4/1996 | Inoue et al. | 396/448 |
| 5,608,478 | 3/1997 | Kamoda | 396/448 |

FOREIGN PATENT DOCUMENTS

U-4-55309  5/1992  Japan .

*Primary Examiner*—David M. Gray
*Attorney, Agent, or Firm*—Oliff & Berridge PLC

[57] ABSTRACT

A camera comprises a camera main body, a taking lens provided at the camera main body and a sliding cover which is capable of sliding between a closed position at which the sliding cover covers the front surface of the taking lens and an open position at which the sliding cover withdraws from the front surface of the taking lens, along the front surface of the camera main body. The camera main body is provided with an outer cover and a groove forming member which is positioned on the inside of the outer cover, where a guide groove extending in the sliding direction of the sliding cover is formed. The sliding cover is provided with a through portion which passes through the outer cover. And a guide projection formed at the through portion is connected with the guide groove in such a manner that they can slide to guide the sliding movement of the sliding cover.

17 Claims, 22 Drawing Sheets

CAMERA PROVIDED WITH A SLIDING COVER

BACKGROUND OF THE INVENTION

1. Field of the Invention

The present invention relates to a camera that is provided with a sliding cover capable of sliding between a position at which it covers the front surface of the taking lens and a position at which it is withdrawn from the front surface of the taking lens.

2. Description of the Related Art

This type of camera in the known art includes, for instance, the one disclosed in Japanese Laying-Open Utility Model No. 4-55309. This camera is provided with a sliding cover that is positioned at the front surface of the camera main body with guide projections at the top and bottom of the sliding cover being engaged in guide grooves formed at the upper surface and the lower surface of the camera outer cover. With this engagement, the sliding cover slides in the lateral direction of the camera.

However, in this camera in the known art, since the guide grooves for guiding the sliding cover are formed at the upper surface and the lower surface of the camera outer cover, much of each guide groove is exposed to the outside whether the camera is in use or not. Thus, foreign matter tends to enter the guide grooves readily, presenting the possibility of the sliding cover becoming jammed or not operating smoothly.

SUMMARY OF THE INVENTION

An object of the present invention is to provide a camera with a sliding cover that ensures that foreign matter does not readily enter the guide grooves for guiding the sliding cover.

In order to achieve the object described above, the camera provided with a sliding cover according to the present invention is constituted as follows.

This camera comprises a camera main body, a taking lens provided at the camera main body and a sliding cover that is capable of sliding between a closed position, at which it covers the front surface of the taking lens, and an open position, at which it is withdrawn from the front surface of the taking lens, along the front surface of the camera main body. The camera main body is provided with an outer cover and a groove forming member positioned on the inside of the outer cover, where a guide groove is formed extending in the sliding direction of the sliding cover. The sliding cover is provided with a through portion that passes through the outer cover and a guide projection formed at the through portion which are engaged in the guide groove in such a manner that they can slide in order to guide the sliding of the sliding cover.

According to the present invention, since the guide groove for guiding the sliding movement of the sliding cover is located at member that is inside the camera outer cover, foreign matter is less likely to enter the guide groove compared to a structure in which the guide grooves are formed at the upper and lower surfaces of the outer cover, eliminating the likelihood of the sliding cover becoming jammed.

Another camera provided with a sliding cover according to the present invention comprises a camera main body provided with a guide portion, a taking lens provided at the camera main body, a sliding cover with a connecting portion that is connected to the guide portion of the camera main body which, guided by the guide portion, is capable of sliding between a closed position, at which it covers the front surface of the taking lens and an open position, at which it is withdrawn from the front surface of the taking lens along the front surface of the camera main body and a stopper member provided at the front surface of the camera main body for preventing the movement of the sliding cover in the direction in which it moves away from the camera main body when it is at the open position.

According to the present invention, since the stopper member prevents the end portion of the sliding cover in the opening direction from becoming lifted upward from the front surface of the camera main body, even when a force is applied to the end portion in the opening direction toward the front of the camera, no large force is applied to the connecting portion for guiding the sliding movement, thus preventing the mechanism from being damaged.

Another camera provided with a sliding cover according to the present invention comprises a camera main body provided with a guide portion, a taking lens provided at the camera main body, a sliding cover with a connecting portion that is connected to the guide portion of the camera main body, which, guided by the guide portion, is capable of sliding between a closed position, at which it covers the front surface of the taking lens, and an open position, at which it is withdrawn from the front surface of the taking lens along the front surface of the camera main body and a flash device that is capable of moving between a storage position, at which it is stored in the camera main body, and an operating position, at which it projects out from the camera main body. The sliding cover is provided with a extension preventing portion which, when the sliding cover is at the closed position connects with the flash device at the storage position to prevent the flash device from extending out to the operating position and when the sliding cover is at the open position, withdraws from the flash device to allow the flash device to extend out to the operating position.

According to the present invention, since, when the sliding cover is at the closed position, i.e., when the camera is not being used, the extension preventing portion of the sliding cover prevents the flash device from projecting out, undesirable projection of the flash device can be reliably prevented.

DETAILED DESCRIPTION OF THE PREFERRED EMBODIMENTS

First Embodiment

A first embodiment according to the present invention is explained in reference to FIGS. 1–8.

Figure 1:
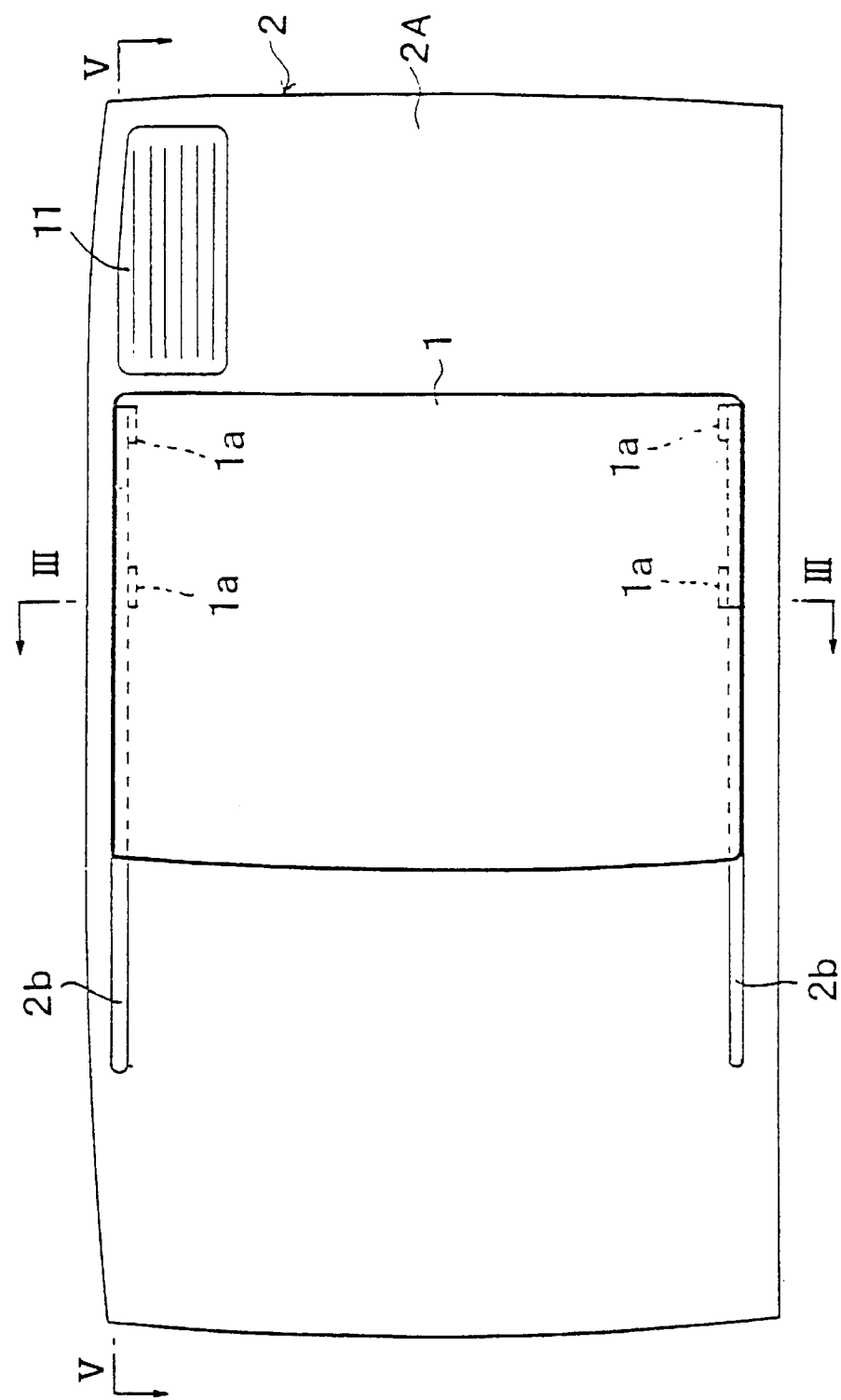
FIG. 1 shows a front view of the camera in a first embodiment according to the present invention, in a state in which the sliding cover is closed.
Figure 2:
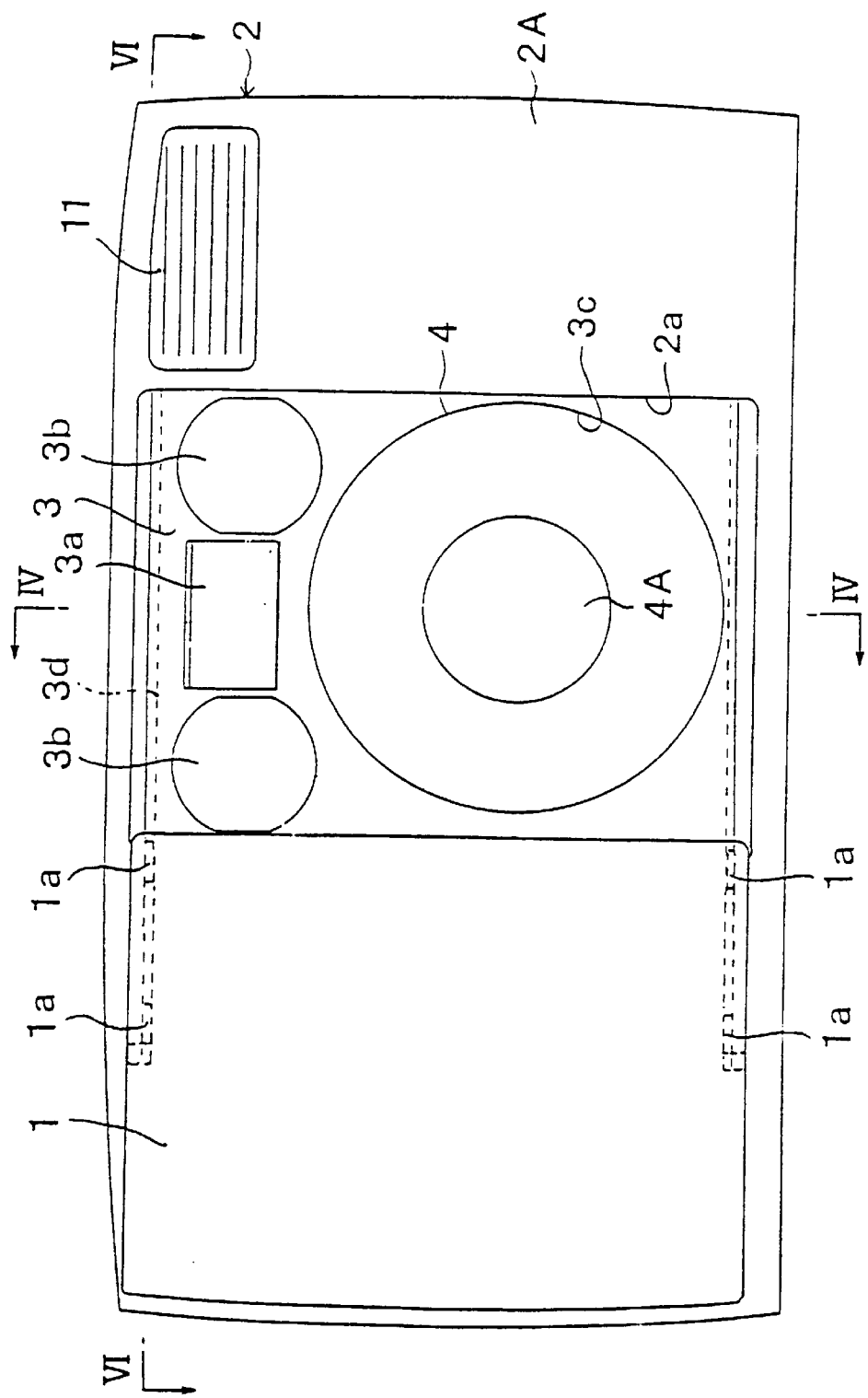
FIG. 2 shows a view similar to that in FIG. 1, in a state in which the sliding cover is open.
Figure 3:
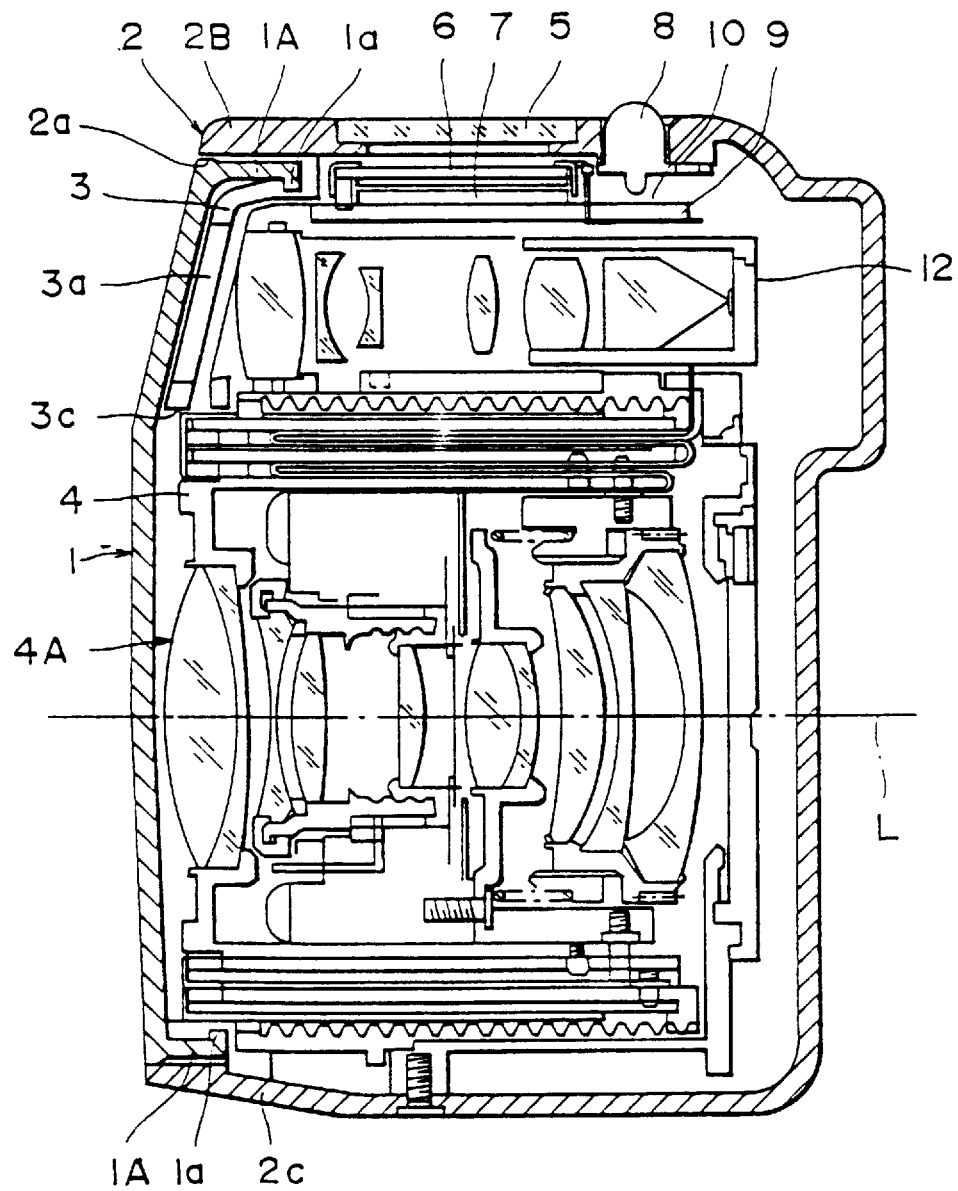
FIG. 3 is a cross section through line III—III in FIG. 1.
Figure 4:
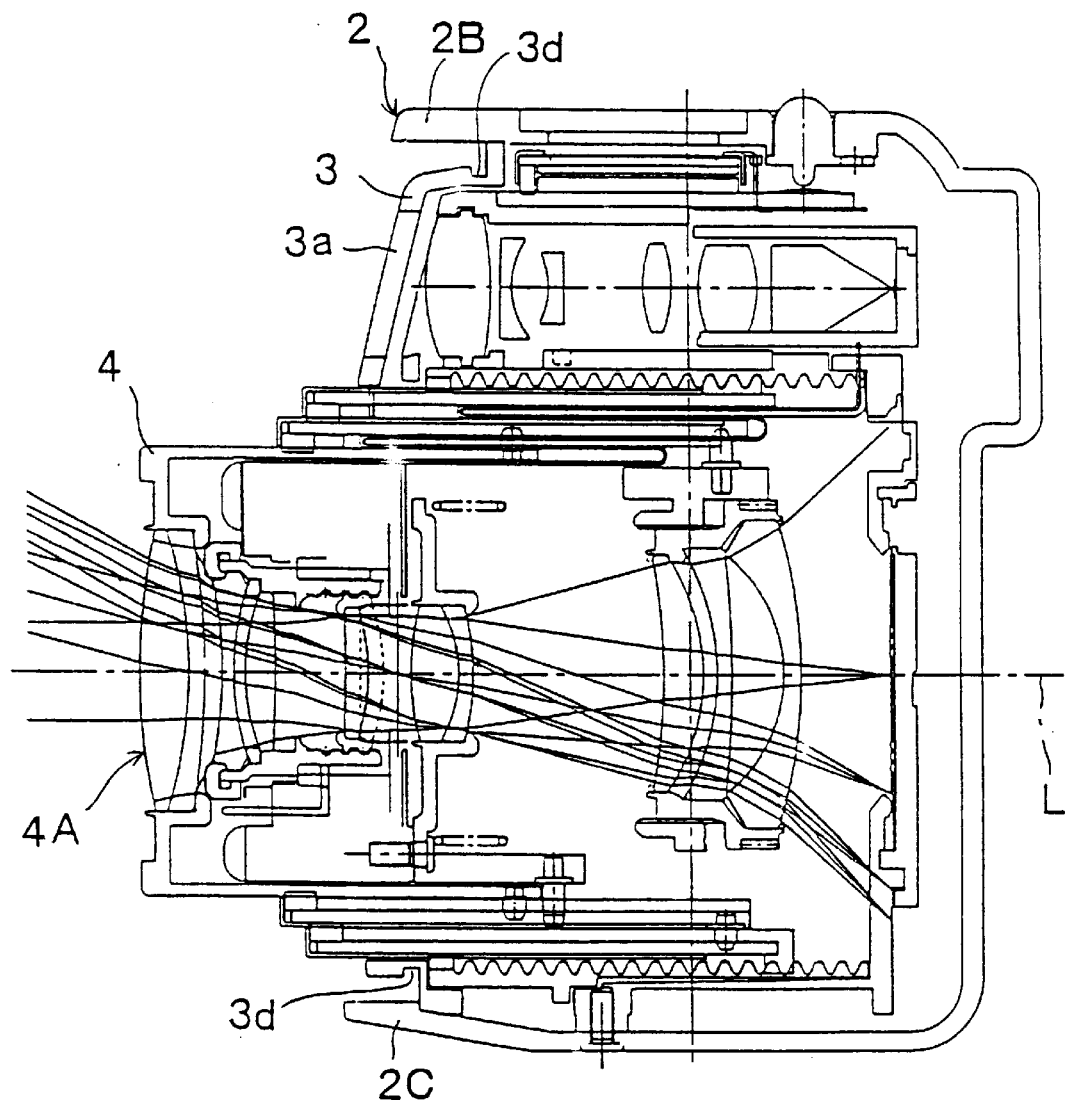
FIG. 4 is a cross section through line IV—IV in FIG. 2.

FIGS. 1 and 2 show front views of the camera in this embodiment while FIGS. 3 and 4 show cross sections through lines III—III and IV—IV in FIGS. 1 and 2 respectively.

Reference number 2 indicates an outer cover which constitutes an external frame of the camera main body. Hereafter, the portions of the outer cover 2 that constitute the front surface, the upper surface and the lower surface of the camera main body are referred to as a front cover 2A, an upper cover 2B and a lower cover 2C, respectively. A strobe light emitting window 11 is provided at the front surface of the front cover 2A, in the upper right area in the figures, and an opening portion 2a (FIG. 2) which is formed in a roughly rectangular shape is provided at the central area in the figures. A pair of slits 2b (FIG. 1), i.e., an upper slit and a lower slit, which communicate with the opening portion 2a, extend to the left of the opening portion 2a.

Reference number 3 indicates an inner cover which is positioned on the inside of the outer cover, with a viewfinder window 3a and a range finder window 3b formed in the upper area of the front surface of the inner cover. In the lower area of the front surface of the inner cover 3, a lens window 3c through which a lens barrel 4 can extend and retract is formed. The viewfinder window 3a, the rangefinder window 3b and the lens window 3c can all be exposed through the opening portion 2a of the front cover 2A. The lens barrel 4 contains a plurality of taking lenses 4A and is capable of moving from a reset position shown in FIG. 3 to a wide angle position shown in FIG. 4 and further to a telephoto position which further projects out from the wide angle position in the direction of the optical axis L.

Reference number 1 indicates a sliding cover that is positioned at the front surface of the front cover 2A, which is capable of sliding between the closed position shown in FIG. 1 and the open position shown in FIG. 2 in the lateral direction of the camera. The sliding cover 1, when it is at the closed position, blocks off the opening portion 2a of the front cover 2A to cover the taking lens 4A the viewfinder window 3a and the range finder window 3b and when it is at the open position, withdraws from the opening portion 2a to uncover them.

Also in reference to FIGS. 5–8, the slide mechanism of the sliding cover 1 is described in detail.

Figure 5:
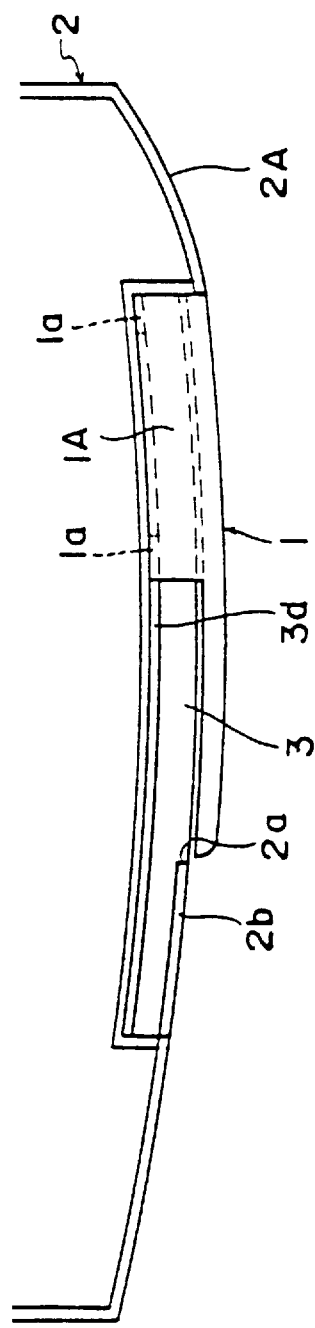
FIG. 5 is a cross section through line V—V in FIG. 1.
Figure 6:
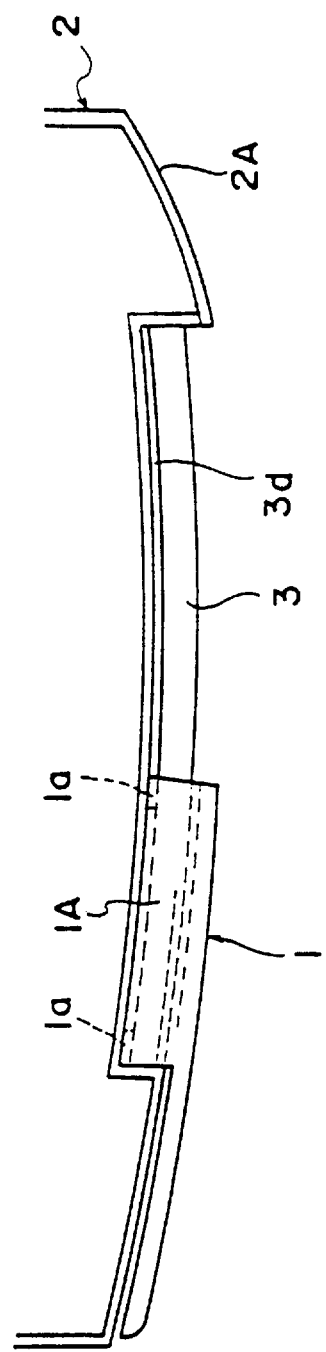
FIG. 6 is a cross section through line VI—VI in FIG. 2.
Figure 7:
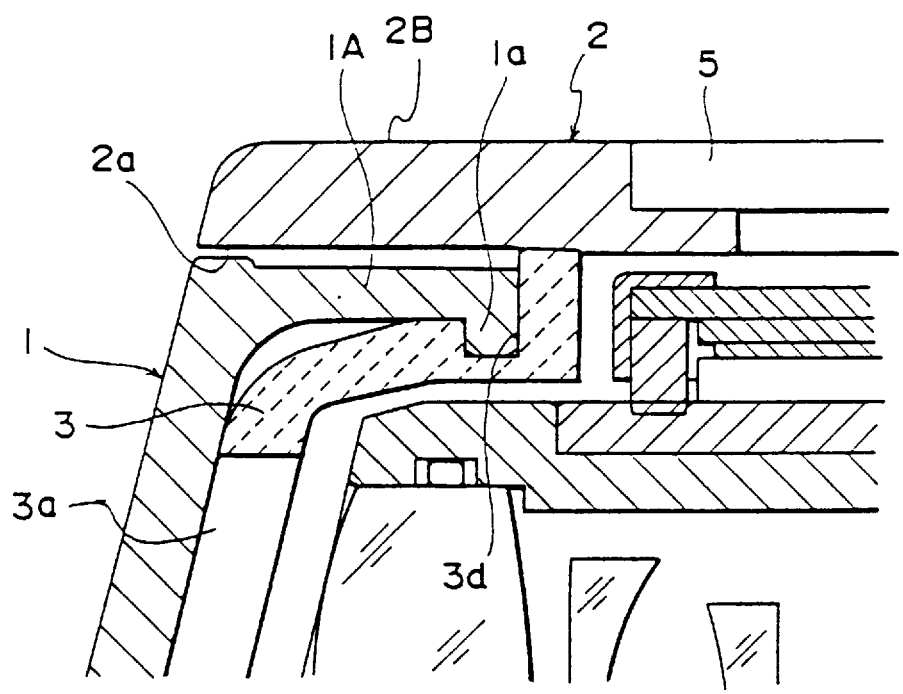
FIG. 7 is a partial enlargement of FIG. 3.
Figure 8:
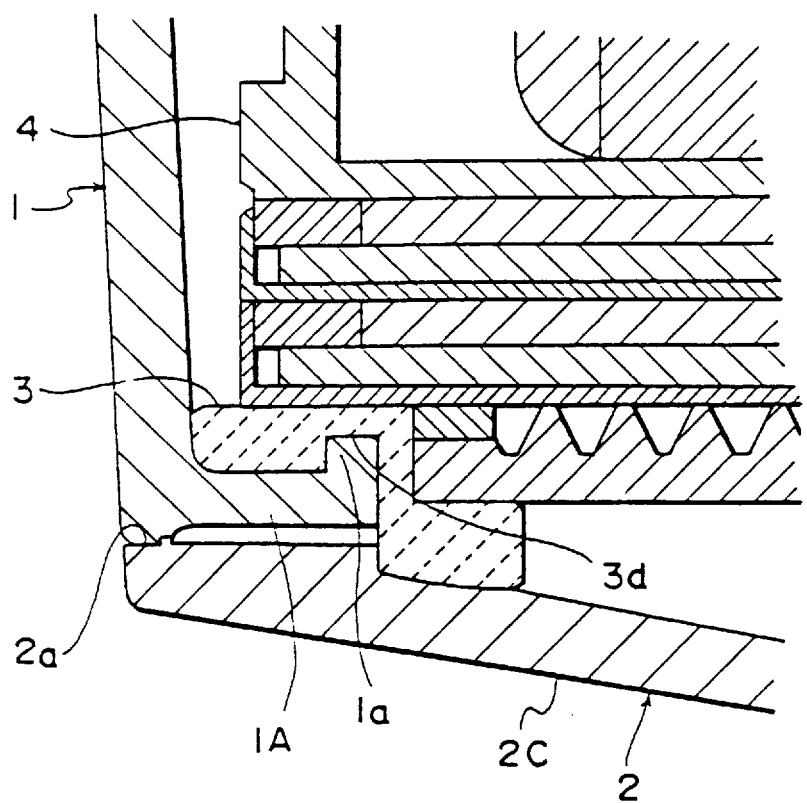
FIG. 8 is a partial enlargement of FIG. 3.

FIGS. 5 and 6 are cross sections through lines V—V and VI—VI in FIGS. 1 and 2 respectively while FIGS. 7 and 8 are partial enlargements of FIG. 3. Overhanging portions 1A which overhang toward the rear surface of the camera are formed at the upper and lower extremities of the sliding cover 1. A pair of tabs 1a is provided projecting perpendicular to the optical axis L at the edges of the lower surface and the upper surface of each of the overhanging portions, i.e., the upper and lower overhanging portions 1A. Guide grooves 3d are provided extending in the lateral direction of the camera at positions which are further toward the inside from the front surface at the upper surface and the lower surface of the inner cover 3, and the tabs 1a of the sliding cover 1 are engaged in the guide grooves 3d in such a manner that the tabs 1a can slide. The upper surface and the lower surface of the inner cover 3 face opposite the lower surface of the upper cover 2B and the upper surface of the lower cover 2C respectively over specific distances and the overhanging portions 1A of the sliding cover 1 are positioned in the gaps thereby created.

In FIG. 3, reference number 5 indicates a liquid crystal display window provided at the upper cover 2B, reference number 6 indicates a liquid crystal display panel, reference number 7 indicates a liquid crystal display back-light, reference number 8 indicates a mode selection switch, reference number 9 indicates an electrical mounting board, reference number 10 indicates a click switch and reference number 12 indicates a viewfinder.

In a camera structured as described above, when the sliding cover 1 is at the closed position, the taking lens 4A, the viewfinder window 3a and the rangefinder window 3b are covered, as shown in FIG. 1. At this time, since the opening portion 2a of the front cover 2A is blocked off, there is no risk of foreign matter entering the guide grooves 3d via the opening portion 2a. While, to the left of the sliding cover 1, the guide grooves 3d are exposed to the outside via the slits 2b, since the slits 2b are narrow and the guide grooves 3d are located at positions further inside, there is little likelihood of foreign matter entering through the slit 2b to get into the guide grooves 3d.

When a force is applied to the sliding cover 1 toward the left, the upper and lower tabs 1a slide in the upper and lower guide grooves 3d of the inner cover 3 and the sliding cover 1 slides toward the left. When this happens, the upper and lower overhanging portions 1A move in the gaps between the inner cover 3 and the upper and lower covers 2B and 2C while passing through the opening portion 2a of the front cover 2A. When the sliding cover 1 has moved to a specific position, the overhanging portions 1A move from the opening portion 2a to the slits 2b and subsequently they move in the state in which they pass through the slits 2b. As shown in FIGS. 2 and 6, when the sliding cover 1 is completely open, the taking lens 4A, the viewfinder window 3a and the rangefinder window 3b are uncovered and the camera enters the photographing enabled state.

When the sliding cover 1 is open, since the opening portion 2a of the front cover 2A is uncovered, the guide grooves 3d become exposed to the outside. However, since the guide grooves 3d are at positions further inside, there is little likelihood of foreign matter entering them. The slits 2b, on the other hand, are blocked off with the overhanging portions 1a and there is no likelihood whatsoever of foreign matter entering into the guide grooves 3d via the slits 2b.

Now, in this embodiment, since the tabs 1a of the sliding cover 1 are provided only toward the right side of the sliding cover 1 as FIG. 1 clearly shows, the length of the slits 2b can be reduced compared to a structure in which tabs 1a are provided toward the left as well. Consequently, the likelihood of foreign matter entering into the guide grooves 3d via the slits 2b when the sliding cover is closed is minimized.

It is to be noted that while the explanation has been given in reference to an example in which the guide grooves are formed in the inner cover, they may be formed at a separate member other than the inner cover. Moreover, the shape and the opening/closing direction of the sliding cover are not limited to those employed in the embodiment.

Second Embodiment second embodiment according to the present invention is explained in reference to FIGS. 9–16. Components that are identical to those in FIGS. 1–8 are assigned with the same reference numbers.

Figure 9:
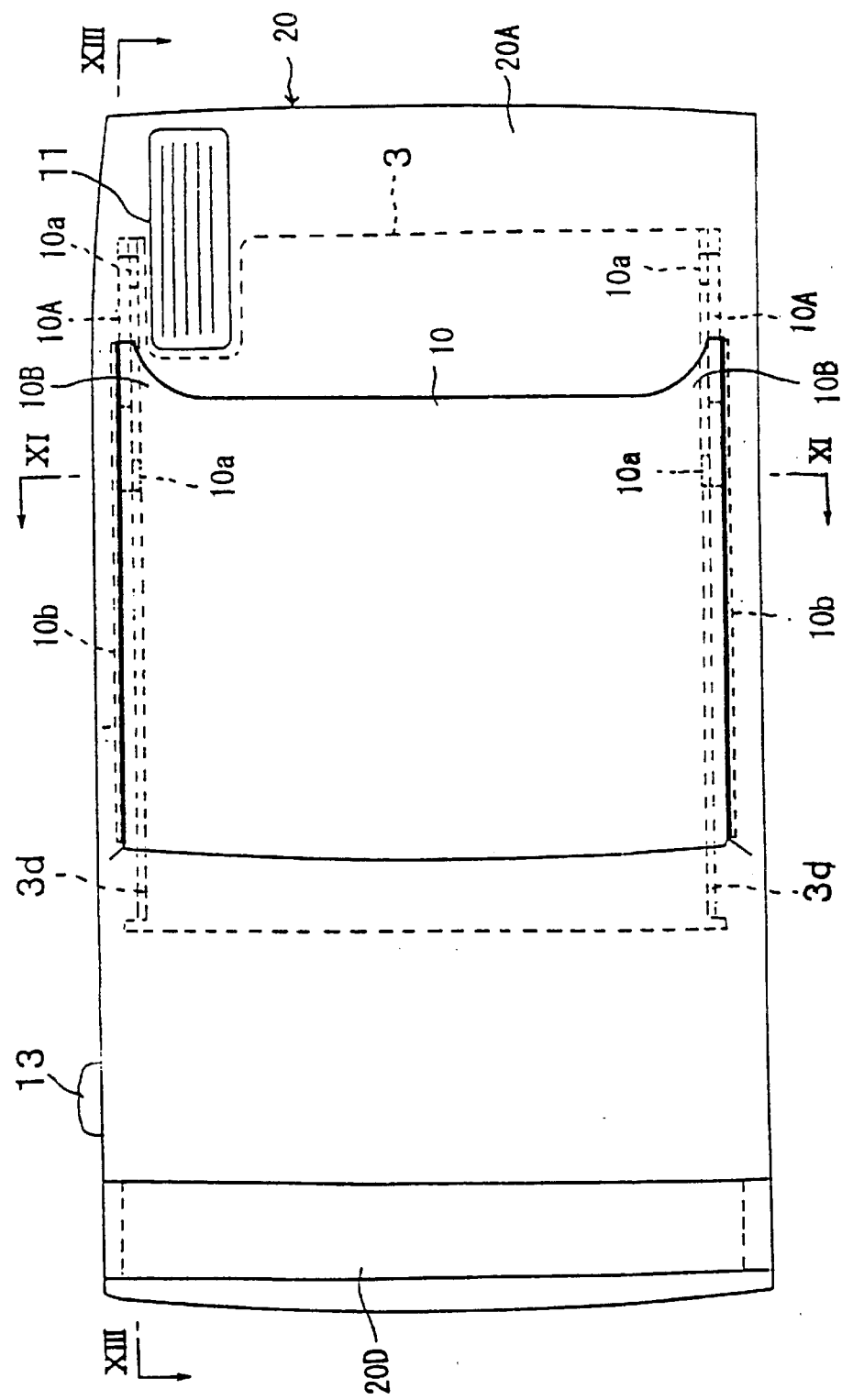
FIG. 9 is a front view of the camera in a second embodiment according to the present invention in a state in which the sliding cover is closed.
Figure 10:
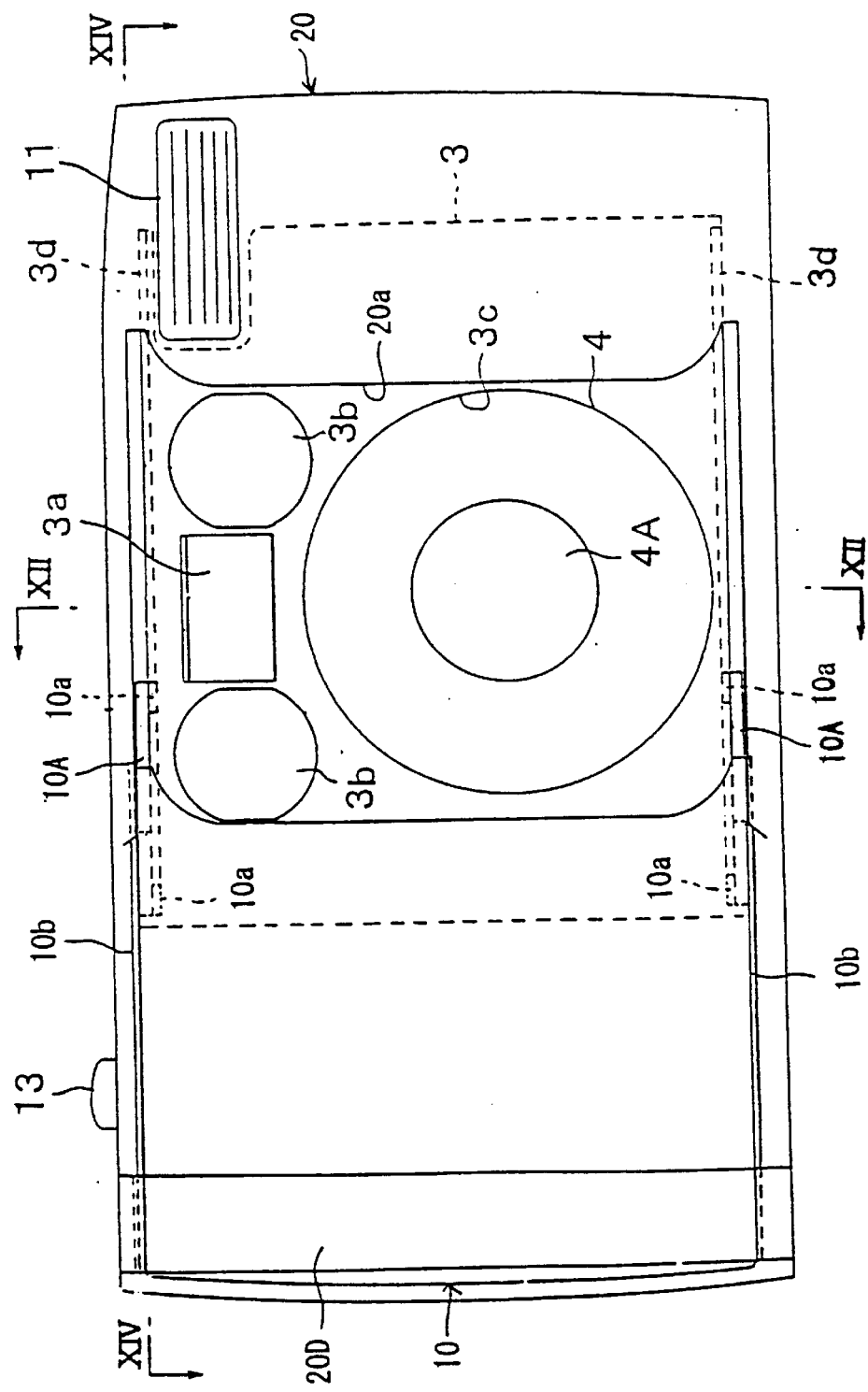
FIG. 10 shows a view similar to that in FIG. 9 in a state in which the sliding cover is open.
Figure 11:
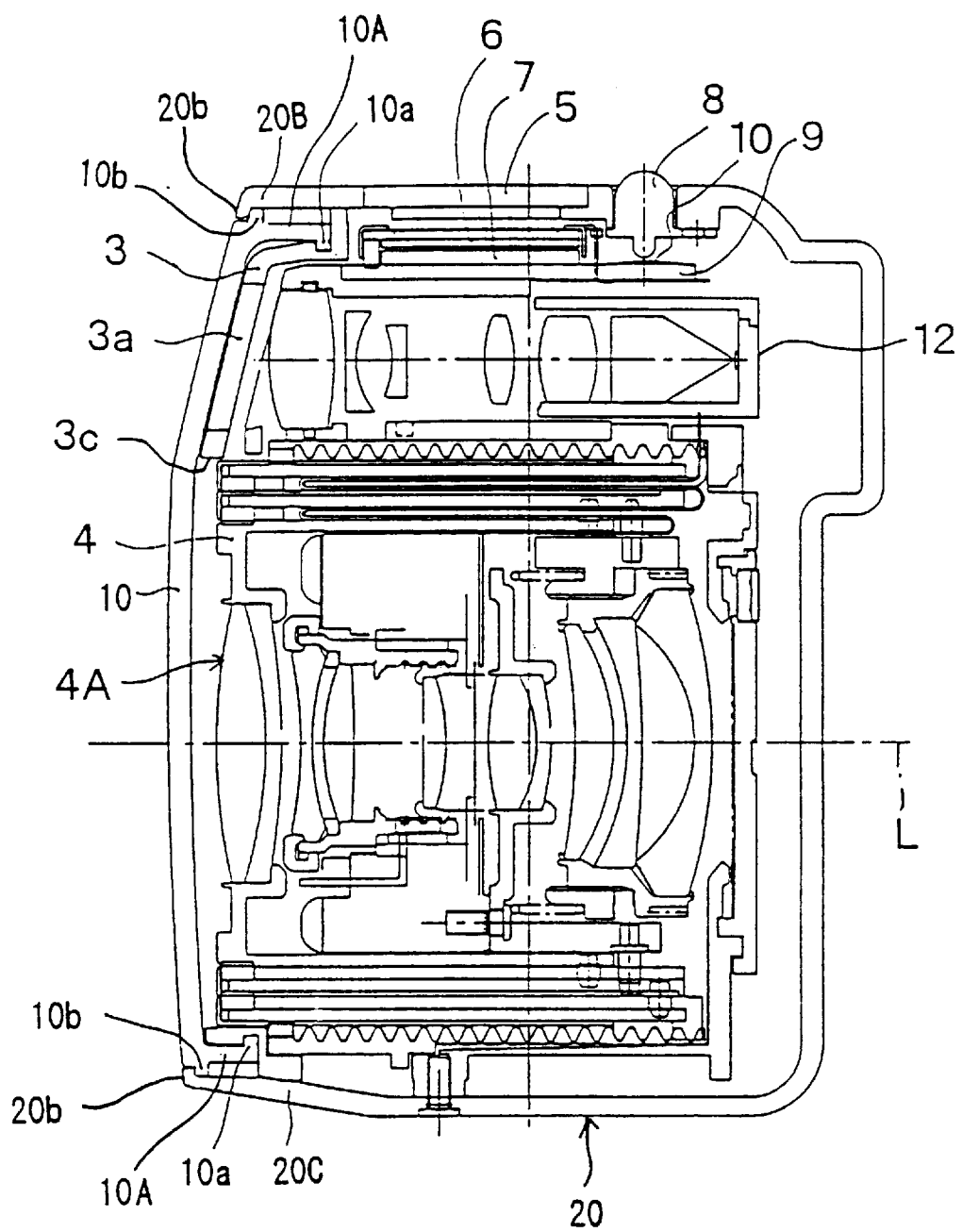
FIG. 11 is a cross section through line XI—XI in FIG. 9.
Figure 12:
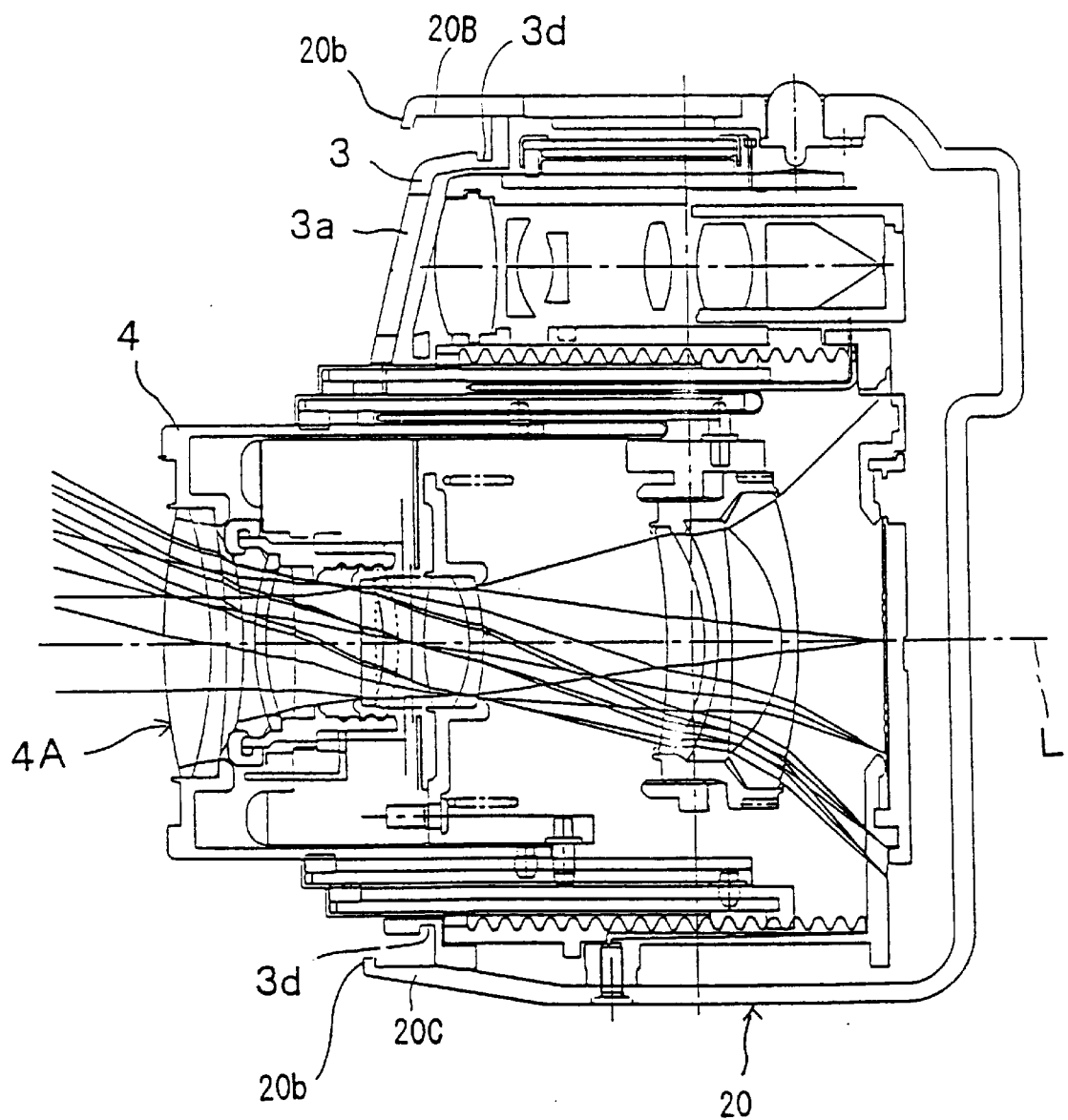
FIG. 12 is a cross section through line XII—XII in FIG. 10.

FIGS. 9 and 10 are front views of the camera in this embodiment, and FIGS. 11 and 12 are cross sections through the lines XI—XI and XII—XII in FIGS. 9 and 10 respectively.

Reference number 20 indicates an outer cover that constitutes an external frame of the camera main body. Hereafter, the portions of the outer cover 20 that constitute a front surface, an upper surface and a lower surface of the camera main body are referred to as a front cover 20A, an upper cover 20B and a lower cover 20C respectively. At the front surface of the front cover 20A, a strobe light emitting window 11 is provided in the upper right area in the figures and an opening portion 20a (FIG. 10) is formed in the central area. In addition, a dock forming member 20D is mounted at the left end of the front cover 20A. The two ends of the dock forming member 20D are secured to the upper end and the lower end of the front cover 20A respectively and between this member 20D and the front surface of the front cover 20, a dock is formed where one end of the sliding cover may be accommodated.

The sliding cover 10 is made capable of sliding between the closed position shown in FIG. 9 and the open position shown in FIG. 10 in the lateral direction of the camera. At the closed position, the sliding cover 10 blocks off the opening portion 20a of the front cover 20A, covering the viewfinder window 3a and the rangefinder window 3b and at the open position, it withdraws from the opening portion 20a to uncover them. Protruding portions 10b are formed over the entire length of the upper end surface and the lower end surface of the sliding cover 10 and the front surfaces of these protruding portions 10b can come in contact with the inner surfaces of extended portions 20b provided at the top and bottom of the opening portion 20a of the front cover (see FIG. 11). As shown in FIG. 9, the right end portion of the sliding cover 10 has a specific shape with extended portions 10B formed at the top and bottom. Because the right end portion of the front cover opening portion 20a is formed in conformance to this specific shape, it is possible to block off the opening portion 20a without leaving any gap when the sliding cover 10 is closed.

Figure 13:
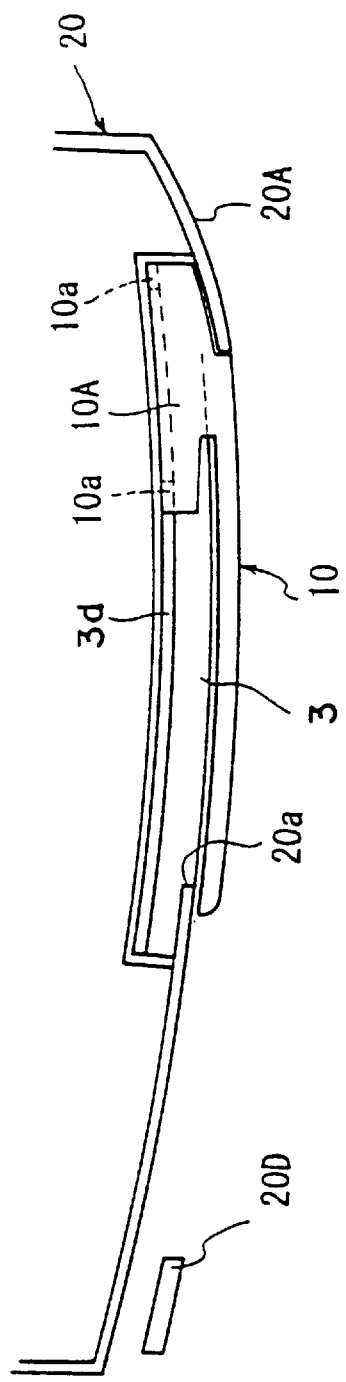
FIG. 13 is a cross section through line XIII—XIII in FIG. 9.
Figure 14:
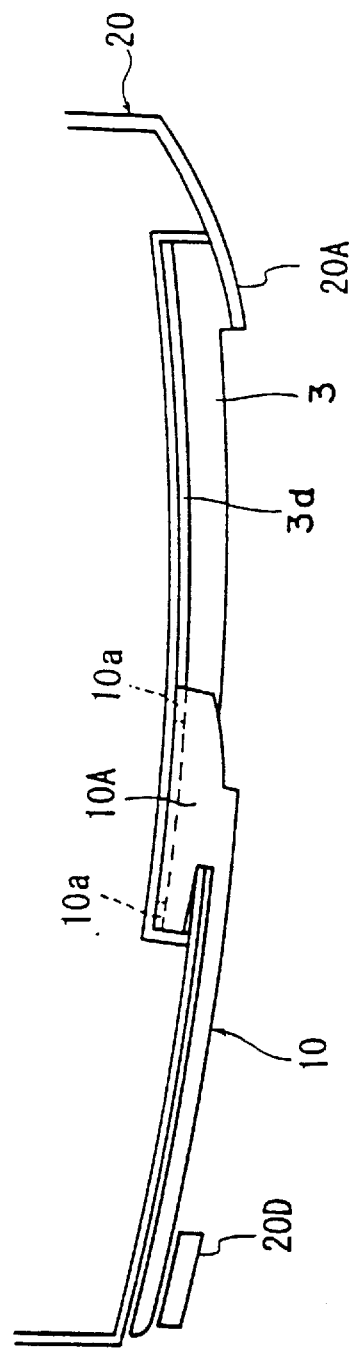
FIG. 14 is a cross section through line XIV—XIV in FIG. 10.
Figure 15:
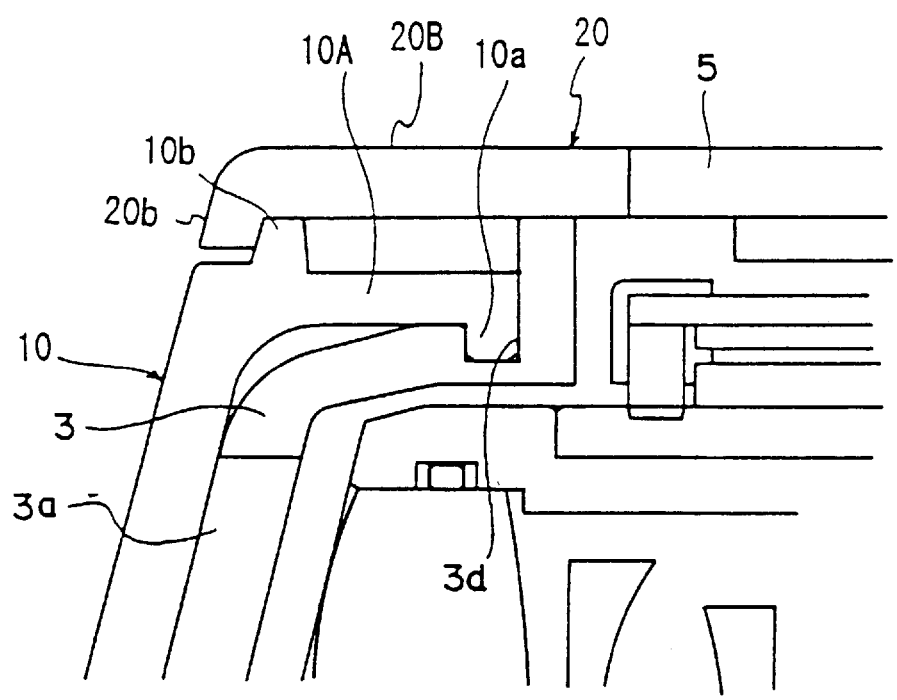
FIG. 15 is a partial enlargement of FIG. 11.
Figure 16:
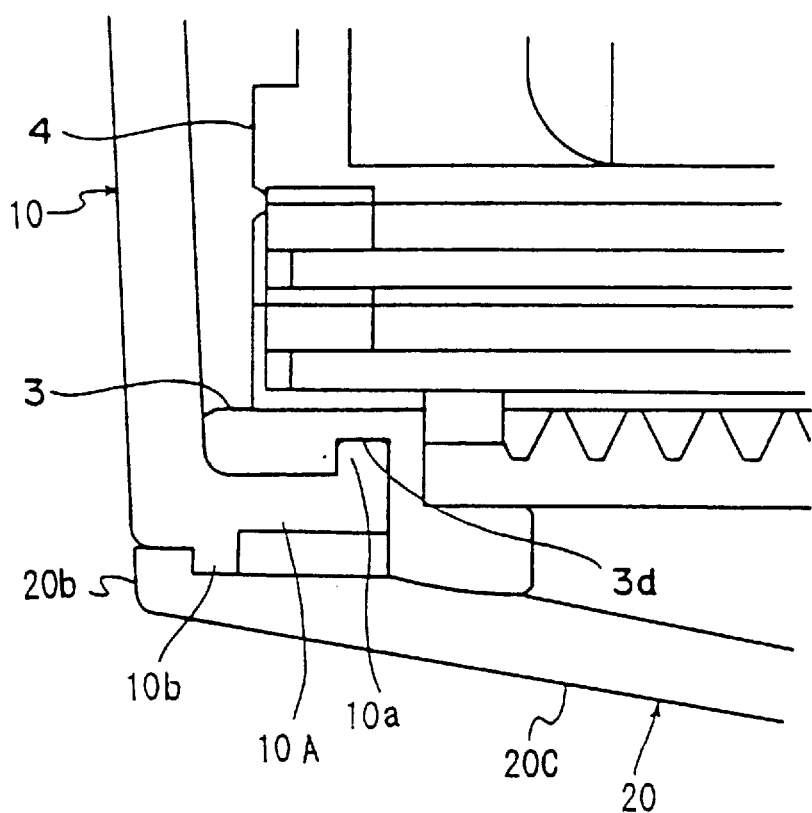
FIG. 16 is a partial enlargement of FIG. 11.

FIGS. 13 and 14 show cross sections through line XIII—XIII in FIG. 10 and through line XIV—XIV in FIG. 11 respectively and FIGS. 15 and 16 are partial enlargements of FIG. 11.

Overhanging portions 10A which overhang toward the rear surface of the camera are formed at the upper and lower protruding portions 10b of the sliding cover 10 and a pair of tabs 10a project perpendicular to the optical axis L at the edges of the lower surface and the upper surface of the upper and lower overhanging portions 10A. At the upper and lower surfaces of the inner cover 3, guide grooves 3d extend in the lateral direction of the camera at positions that are further inside from the front surface so that the tabs 10a of the sliding cover 10 are slidably engaged in these guide grooves 3d. The upper surface and the lower surface of the inner cover 3 face opposite the lower surface of the upper cover 20B and the upper surface of the lower cover 20C respectively over specific distances and the overhanging portions 10A of the sliding cover 10 are positioned in the gaps thereby formed.

In the camera structured as described above, when the sliding cover 10 is at the closed position, the taking lens 4A, the viewfinder window 3a and the rangefinder window 3b are covered, as shown in FIG. 9. At this time, the protruding portions 10b formed at the upper and lower end surfaces of the sliding cover 10 are placed in contact over their entire surfaces with the extended portions 20b and, with this, the sliding cover 10 is prevented from becoming lifted upward from the front cover 20A (prevented from moving in the direction in which it distances itself from the front cover 20A).

When a force is applied to the sliding cover 10 to the left, the upper and lower tabs 10a slide inside the upper and lower guide grooves 3d of the inner cover 3 and the sliding cover 10 slides to the left. When this happens, the upper and lower overhanging portions 10A move in the gaps between the inner cover 3 and the upper and lower covers 20B and 20C in a state in which it passes through the opening portion 20a of the front cover 20A. While the protruding portions 10b of the sliding cover 10 slide over the extended portions 20b, since the extended portions 20b are provided only at the upper and lower portions of the opening portion 20a, the protruding portions 10b become disengaged from the extended portions 20b as the sliding cover 10 is opened and the disengaged portion becomes exposed to the outside.

When the sliding cover 10 is completely open, as shown in FIGS. 10 and 14, the protruding portions 10b are disengaged from the extended portions 20b except for an extremely small portion at their right end. At this point, the sliding cover 10 is in a state in which only its right end portion (the end portion in the closing direction) is supported by the camera main body with its left end portion (the end portion in the opening direction) stored in the dock formed between the dock forming member 20D and the front cover 20A. Thus, the sliding cover 10 is prevented from becoming lifted upward off the front cover 20A. In other words, even if a force is applied to the left end portion of the sliding cover 10 toward the front of the camera for some reason, with the front surface of the sliding cover 10 being in contact with the dock forming member 20D, the sliding cover 10 is prevented from becoming lifted upward. Consequently, no great force is applied to the guide projections 10b provided toward the right end of the sliding cover 10 and they are prevented from becoming damaged. Moreover, the dock forming member 20D can also be used as a grip for holding the camera, to ensure that the camera is held securely.

Now, in this embodiment, when the sliding cover 10 is closed, the opening portion 20a of the front cover 20A is blocked off and in this state, the guide grooves 3d of the inner cover 3 are completed isolated from the outside. As a result, no foreign matter enters the guide grooves 3d of the inner cover 3. This structure is achieved by forming the guide protruding portions 10a for guiding the sliding movement only at the right end of the sliding cover 10. When the sliding cover 10 is in the open state, on the other hand, while the guide grooves 3d are exposed to the outside with the opening portion 20a of the front cover 20A open, since the guide grooves 3d are at positions further inside, there is little likelihood of foreign matter entering them. Consequently, with the camera in this embodiment, the sliding cover 10 can be opened/closed smoothly at all times.

It is to be noted that there are no restrictions imposed upon the form or the mounting state of the stopper member as long as it is in contact with at least the portion of the sliding cover 10 toward the end in the opening direction in order to ensure that the end portion of the sliding cover 10 in the opening direction is prevented from lifting upward off the camera main body. There are no particular restrictions imposed upon in regard to the positions of the guide grooves and they may provided at positions where they are exposed to the outside. Neither the shape or the opening/closing direction of the sliding cover is limited to that in the embodiments.

Third Embodiment

A third embodiment according to the present invention is explained in reference to FIGS. 17–22. Components identical to those in FIGS. 9–16 are assigned with the same reference numbers.

Figure 17:
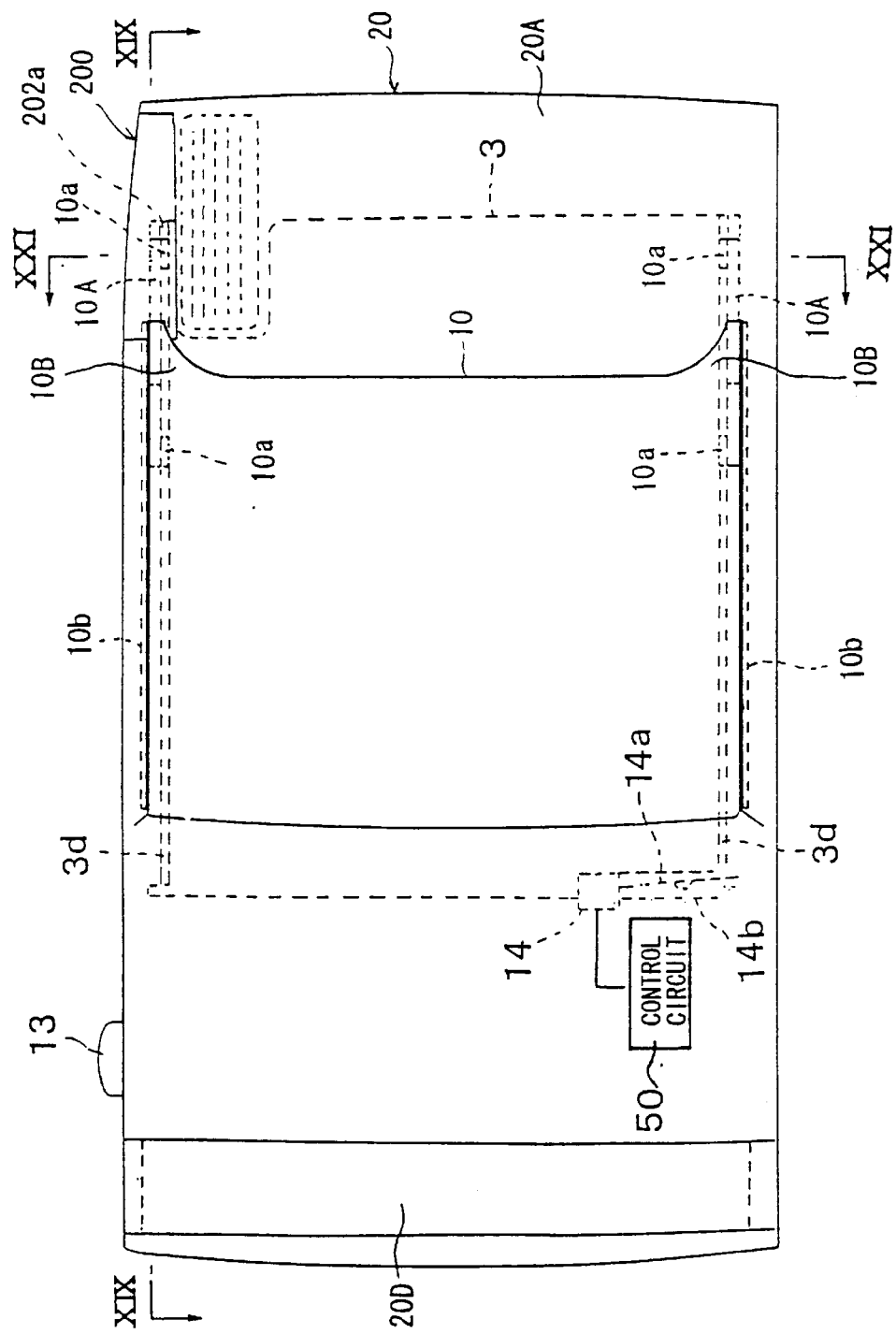
FIG. 17 is a front view of the camera in a third embodiment according to the present invention, in a state in which the sliding cover is closed.
Figure 18:
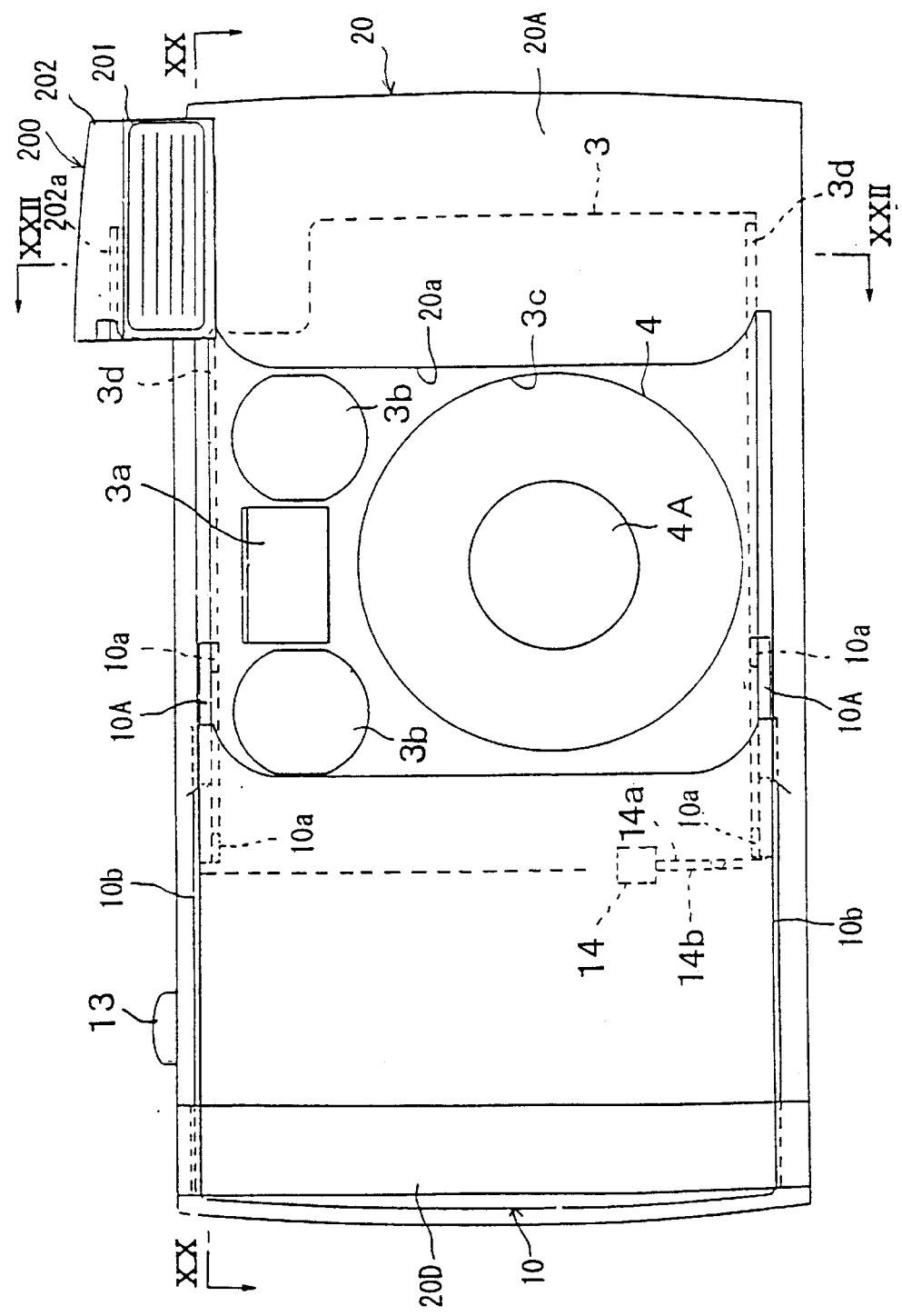
FIG. 18 shows a view similar to that in FIG. 17, in a state in which the sliding cover is open.
Figure 19:
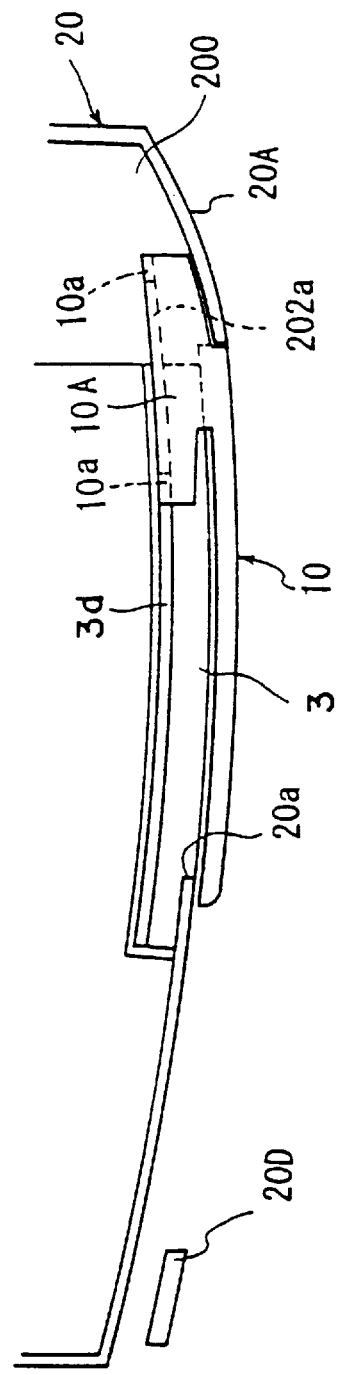
FIG. 19 is a cross section through line XIX—XIX in FIG. 17.
Figure 20:
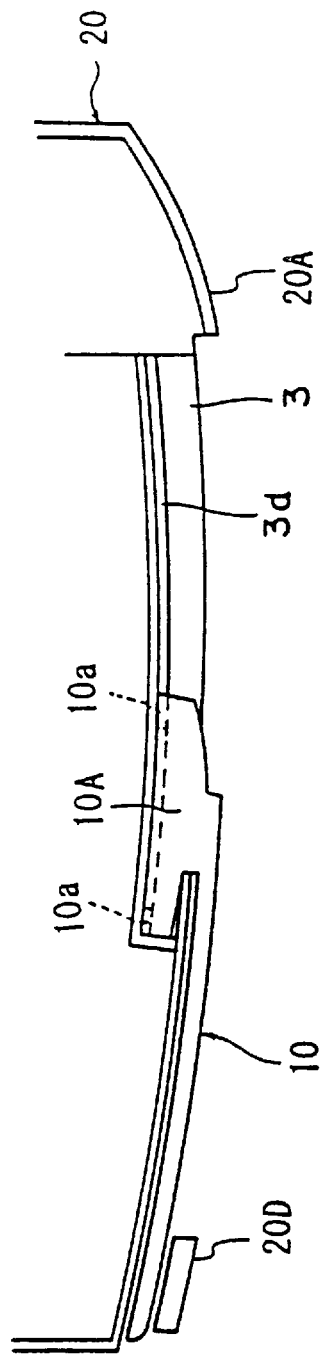
FIG. 20 is a cross section through line XX—XX in FIG. 18.

FIGS. 17 and 18 show front views of the camera in this embodiment and FIGS. 19 and 20 are cross sections through lines XIX—XIX and XX—XX in FIGS. 17 and 18 respectively.

Between the front cover 20A and the inner cover 3, a sliding cover open/closed detection switch 14 is provided. This switch 14 holds an on state when one of its contact pieces, i.e., the contact piece 14a is pressed against the other contact piece, i.e., the contact piece 14b by the lower tab 10a on the left hand side of the sliding cover 10 when the sliding cover 10 is in the open position. When the sliding cover 10 moves in the closing direction, the contact piece 14a moves away from the contact piece 14b and the switch is turned off. The switch 14 is connected to a control circuit 50 which is provided inside the camera.

Figure 21:
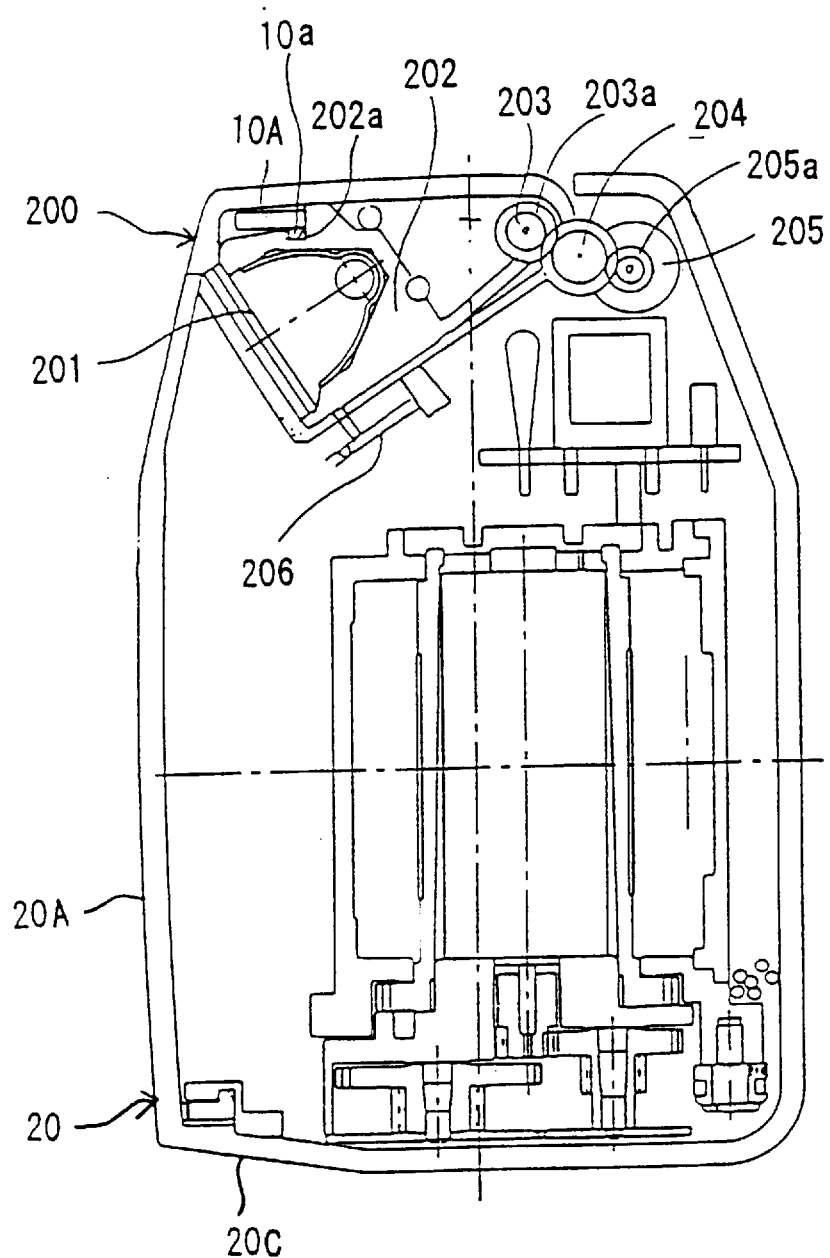
FIG. 21 is a cross section through line XXI—XXI in FIG. 17.
Figure 22:
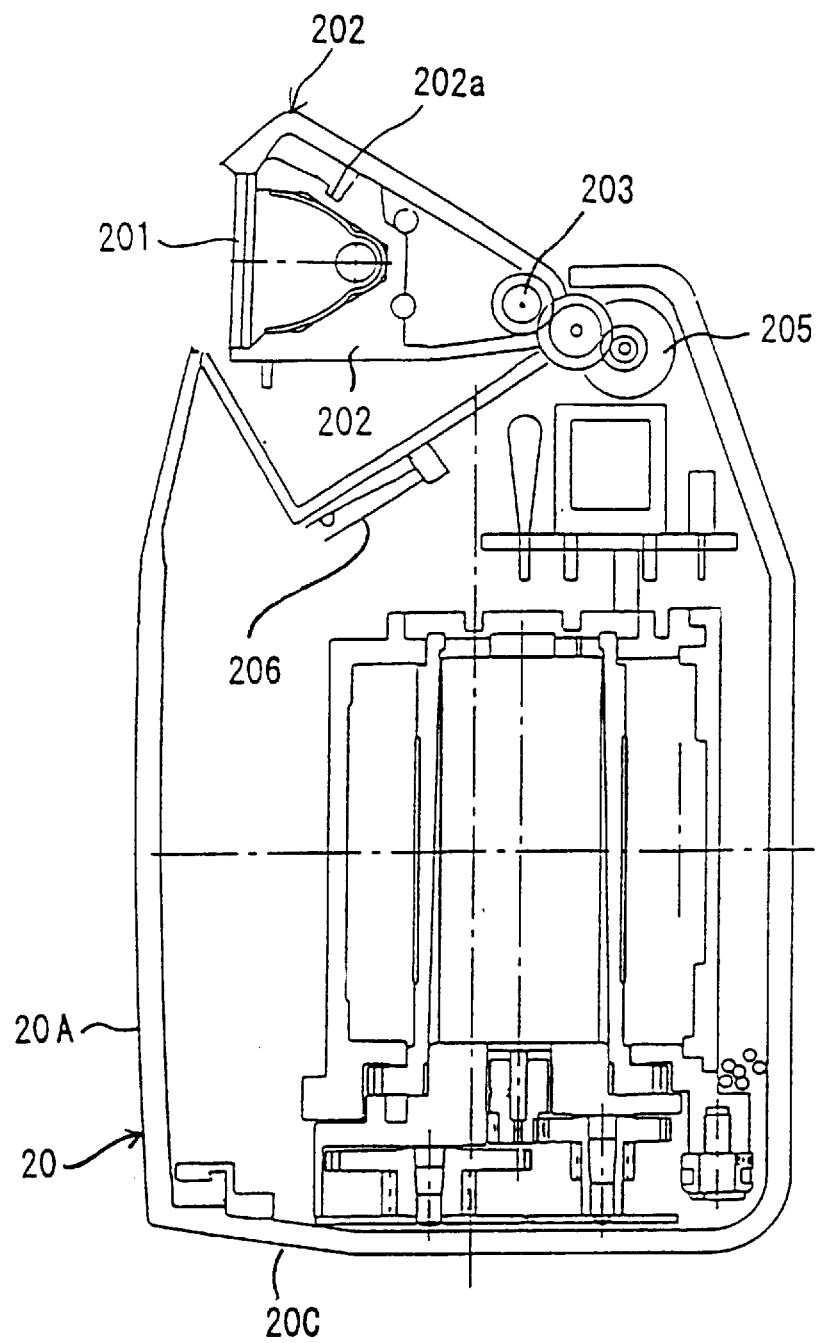
FIG. 22 is a cross section through line XXII—XXII in FIG. 18.

FIGS. 21 and 22 are cross sections through lines XXI—XXI and XXII—XXII respectively in FIGS. 17 and 18. A pop up type flash device 200 which is provided in the camera in the upper right end side in the figure is provided with a light emitting portion 201 and a holder 202 which holds the light emitting portion 201. The rear end portion of the holder 202 is supported rotatably with a shaft 203 at the center, and a gear 203a formed on the circumferential surface of the shaft 203 interlocks with a gear 205a that is mounted at a rotating shaft of a stepping motor 205 via an idle gear 204. With the rotation of the stepping motor 205, the flash device 200 can be made to rotate from a storage position (FIG. 21), at which it is stored in the camera main body, to a front light emitting position (FIG. 22) at which the light emitting portion 201 faces front and further to a bounce light emitting position at which the light emitting portion 201 faces upward. The stepping motor 205 is driven and controlled by the control circuit 50.

At the holder 202, a groove 202a, which extends in the lateral direction of the camera, is formed above the light emitting portion 201. As shown in FIGS. 17 and 19, when the flash device 200 is at the storage position, the groove 202a communicates with a guide groove 3d of the inner cover 3 so that the tabs 10a of the sliding cover 10 which are engaged in the guide groove 3d can move into the groove 202a. Reference number 206 indicates a flash device position detection switch that is connected to the control circuit 50 that is turned on when the flash device 200 is at the storage position and is in an off state otherwise.

In a camera structured as described above, when the sliding cover 10 is at the closed position, the taking lens 4A, the viewfinder window 3a and the range finder window 3b are covered in the same manner as described earlier. At this point, as shown in FIGS. 17 and 19, the upper overhanging portion 10A of the sliding cover 10 protrudes out toward the flash device 200 and a tab 10a formed to the right of the overhanging portion 10A is engaged in the groove 202a of the holder 202. Consequently, even if a force is, for some reason, applied to the flash device 200 while it is at the storage position in the direction in which it would be projected out, the flash device 200 does not project out in an undesirable manner. It is to be noted that the protruding portions 10b formed at the upper and lower end surfaces of the sliding cover 10 are placed in contact with the extended portions 20b of the front cover 20 over the entire surfaces, and with this, the sliding cover 10 is prevented from lifting upward off the front cover 20A.

When a force is applied to the sliding cover 10 to the left, the upper and lower tabs 10a slide inside the upper and lower guide grooves 3d of the inner cover 3 and the sliding cover 10 slides to the left. The upper tab 10a on the right hand side alone initially slides inside the groove 202a of the flash device 200 and when the sliding cover 10 becomes open to an extent, it moves into a guide groove 3d. Thus, the flash device 200 is allowed to pop up. It is to be noted that while the protruding portions 10b of the sliding cover 10 slide on the extended portions 20b, since the extended portions 20b are provided only at the top and bottom portions of the opening portion 20a, the protruding portions 10b gradually move away from the extended portions 20b as the sliding cover 10 is opened and the disengaged portions are exposed to the outside.

As shown in FIG. 18, when the sliding cover 10 is completely open, the sliding cover open/closed detection switch 14 is turned on by the lower tab 10a on the left hand side. At this point, the protruding portions 10b disengage from the extended portions 20b except for the extremely short portion at the right end. However, since the left end portion of the sliding cover 10 is housed in the dock between the dock forming member 20D and the front cover 20A, the sliding cover 10 is prevented from becoming lifted upward from the front cover 20A.

When a specific operation is performed with the sliding cover 10 at the open position, the control circuit 50 drives the stepping motor 205 and the flash device 200 is popped up to the operating position. When the flash device 200 is at the operating position, since the guide groove 3d of the inner cover 3 and the groove 202a of the flash device 200 are not contiguous, the sliding cover 10 cannot be slid to the closed position. However, in this embodiment when the sliding cover 10 is at the open position and is made to slide to the right (the closed position), the sliding cover open/closed detection switch 14 is turned off and with this, the control circuit 50 makes a decision as to the on/off state of the flash device position detection switch 206. Then, if the switch 206 is in an off state, i.e., if the flash device 200 is at the operating position, the control circuit 50 drives the stepping motor 205 so that the flash device 200 is moved to the storage position and stored. Thus, a guide groove 3d and the groove 202a become contiguous with each other and it becomes possible to slide the sliding cover 10 to the closed position.

Now, in this embodiment, the opening portion 20a of the front cover 20A is blocked off when the sliding cover 10 is in a closed state and in this state, the guide grooves 3d of the inner cover 3 are completely isolated from the outside.

Consequently, no foreign matter enters the guide grooves 3*d* of the inner cover 3 from the outside. This is achieved by forming the guide projections 10*a* for guiding the sliding movement only at the right end portion of the sliding cover 10. When the sliding cover 10 is in an open state, on the other hand, since the opening portion 20*a* of the front cover 20A is open, the guide grooves 3*d* communicate with the outside. However, since the guide grooves 3*d* are at positions toward the inside, there is little likelihood of foreign matter entering in this state either. As a result, with the camera in this embodiment, the sliding cover 10 can be opened/closed smoothly at all times.

It is to be noted that the flash device may be of the type which is moved up/down manually without employing an actuator such as a motor. In addition, while the explanation has been given of the type of flash device which moves up/down using a rotary system, it may be of the type which slides up/down. Moreover, while in the explanation given above, a groove in which the tabs provided on the slider cover become engaged are provided on the flash device, this type of groove is not necessarily required. In summary, the only structural requirement is that the flash device be mechanically prevented from popping up by a portion of the sliding cover when it is at the closed position. In addition, no particular restrictions are imposed upon the position of the guide grooves and they may be provided at positions exposed to the outside. Moreover, the form or the opening/closing direction of the sliding cover is not limited to those in the embodiment.

We claim:

1. A camera comprising:

a camera main body;

a taking lens provided at said camera main body; and a sliding cover that is capable of sliding between a closed position, at which said sliding cover covers a front surface of said taking lens, and an open position, at which said sliding cover withdraws from said front surface of said taking lens, along a front surface of said camera main body, wherein:

said camera main body is provided with an outer cover, having an opening, and an inner cover, positioned inside said outer cover;

said inner cover is provided with a portion which is exposed through said opening to expose said taking lens when said sliding cover is at said open position, and a guide groove formed extending in a sliding direction of said sliding cover; and said sliding cover is provided with a through portion that passes through said outer cover and a guide projection formed at said through portion that is slidably engaged in said guide grove in order to guide a sliding movement of said sliding cover.

2. A camera according to claim 1, wherein:

said sliding cover covers said opening when said sliding cover is at said closed position and said sliding cover withdraws from said opening when said sliding cover is at said open position.

3. A camera according to claim 1, wherein:

said guide projection is provided only at an area extending from a central portion of said sliding cover in a sliding direction thereof to an end portion in a closing direction thereof.

4. A camera according to claim 1, further comprising:

a stopper member that is provided at a front surface of said outer cover to prevent movement of said sliding cover at said open position in a direction in which said sliding cover moves away from said outer cover.

5. A camera comprising:

a camera main body;

a taking lens provided at said camera main body; and a sliding cover that is capable of sliding between a closed position, at which said sliding cover covers a front surface of said taking lens, and an open position, at which said sliding cover withdraws from said front surface of said taking lens, along a front surface of said camera main body, wherein:

said camera main body is provided with an outer cover, a groove forming member positioned inside said outer cover, where a guide groove is formed extending in a sliding direction of said sliding cover, and a stopper member;

said sliding cover is provided with a through portion that passes through said outer cover, a guide projection formed at said through portion that is slidably engaged in said guide groove in order to guide a sliding movement of said sliding cover, and a protruding portion that extends in said sliding direction apart from said guide projection; and said protruding portion comes in contact with said stopper member to prevent movement of said sliding cover in a direction in which said sliding cover moves away from said outer cover.

6. A camera according to claim 5, wherein:

when said sliding cover is slid to said open position, said protruding potion and said stopper member enter a non contact state at least at an end of said sliding cover in an opening direction.

7. A camera comprising:

a camera main body provided with a guide portion;

a taking lens provided at said camera main body;

a sliding cover, provided with a connecting portion that connects with said guide portion of said camera main body, which, guide by said guide portion, is capable of sliding between a closed position, at which said sliding cover covers a front surface of said taking lens, and an open position, at which said sliding cover withdraws from said front surface of said taking lens, along a front surface of said camera main body; and a stopper member provided at said front surface of said camera main body, said stopper member coming into contact with an end portion of said sliding cover toward an opening direction thereof when said sliding cover is at said open position, to regulate movement of said sliding cover in a direction in which said sliding cover moves away from said front surface of said camera main body.

8. A camera according to claim 7, wherein:

said stopper member prevents movement of said sliding cover in a direction in which said sliding cover moves away from said camera main body by coming into contact with an end portion of said sliding cover toward an opening direction thereof.

9. A camera according to claim 7, wherein:

said connecting portion is provided only in an area extending from a center of said sliding cover in a sliding direction thereof to an end portion in a closing direction thereof.

10. A camera according to claim 7, wherein:

said camera main body is provided with an outer cover and groove forming member provided inside said outer cover where a guide groove extending in a sliding direction of said sliding cover is formed; and said sliding cover is provided with a through portion that passes through said outer cover, and said connecting portion is formed in said through portion.

11. A camera comprising:

a camera main body provided with a guide portion;

a taking lens provided at said camera main body;

a sliding cover, provided with a connecting portion that connects with said guide portion of said camera main body, which, guided by said guide portion, is capable of sliding between a closed position, at which said sliding cover covers a front surface of said taking lens, and an open position, at which said sliding cover withdraws from said front surface of said taking lens, along a front surface of said camera main body; and a flash device that is capable of moving between a storage position, at which said flash device is stored in said camera main body, and an operating position, at which said flash device extends out from said camera main body;

wherein:

said sliding cover is provided with a extension preventing portion which, when said sliding cover is at said closed position, prevents said flash device from extending out to said operating position by becoming connected with said flash device which is placed at said storage position, and when said sliding cover is at said open position, withdraws from said flash device to allow said flash device to extend out to said operating position.

12. A camera according to claim 11, wherein:

said connecting portion is provided at said extension preventing portion.

13. A camera according to claim 12, wherein:

said flash device is provided with a linking guide portion which is linked with said guide portion of said camera main body at said storage position, and when said sliding cover is slid to said closed position, said connecting portion becomes disengaged from said guide portion of said camera main body and becomes connected with said linking guide portion of said flash device.

14. A camera according to claim 13, wherein:

said guide portion of said camera main body and said linking guide portion of said flash device are constituted of grooves extending in a sliding direction of said sliding cover, and said connecting portion of said sliding cover is constituted of a guide projection that becomes connected with said guide portion of said camera main body and with said linking guide portion of said flash device.

15. A camera according to claim 11, wherein:

said camera main body is provided with an outer cover and a groove forming member provided inside of said outer cover, where a guide groove constituting said guide portion extending in a sliding direction of said sliding cover is formed; and said sliding cover is provided with a through portion that passes through said outer cover, and said extension preventing portion is formed in said through portion.

16. A camera according to claim 11 further comprising:

a switch which detects movement of said sliding cover from said open position to said closed position to output a closed signal; and a drive control device that, in response to an output of said closed signal, drives said flash device at said operating position to said storage position.

17. A camera comprising:

a camera main body provided with a guide portion;

a taking lens provided at said camera main body;

a sliding cover, provided with a connecting portion that connects with said guide portion of said camera main body, which, guided by said guide portion, is capable of sliding between a closed position, at which said sliding cover covers a front surface of said taking lens, and an open position, at which said sliding cover withdraws from said front surface of said taking lens, along a front surface of said camera main body; and a first stopper member provided at said front surface of said camera main body, which regulates movement of said sliding cover at said open position in a direction in which said sliding cover moves away from said camera main body, wherein:

said sliding cover is provided with a protruding portion extending in a sliding direction apart from said connecting portion;

said camera main body is provided with a second stopper member that regulates the movement of said sliding cover in the direction in which said sliding cover moves away from said outer cover by becoming in contact with said protruding portion;

said second stopper member is provided at a position at which said second stopper member is connected only with an end portion of said sliding cover toward a closing direction thereof when said sliding cover is at said open position; and said first stopper member is provided at a position at which said first stopper member can come in contact with an end portion of said sliding cover toward an opening direction thereof when said sliding cover is at said open position.

* * * * *